United States Patent
Bennett et al.

(10) Patent No.: US 7,677,002 B2
(45) Date of Patent: Mar. 16, 2010

(54) WALL SHEATHING SYSTEM AND METHOD OF INSTALLATION

(75) Inventors: John L. Bennett, Nicholson, GA (US); Joel F. Barker, Townville, SC (US); Rick D. Jordan, Lawrenceville, GA (US); Thomas L. Schuman, Jefferson, GA (US); Nian Ou, Dacula, GA (US); Neil C. Swiacki, Harrisburg, NC (US); Kelly R. Flaherty, Braselton, GA (US)

(73) Assignee: Huber Engineered Woods LLC, Charlotte, NC (US)

( * ) Notice: Subject to any disclaimer, the term of this patent is extended or adjusted under 35 U.S.C. 154(b) by 1154 days.

(21) Appl. No.: 11/029,300

(22) Filed: Jan. 4, 2005

(65) Prior Publication Data
US 2005/0229524 A1 Oct. 20, 2005

Related U.S. Application Data

(60) Provisional application No. 60/547,029, filed on Feb. 23, 2004, provisional application No. 60/547,031, filed on Feb. 23, 2004.

(51) Int. Cl.
*E04B 2/02* (2006.01)
*E04D 5/00* (2006.01)

(52) U.S. Cl. ............... 52/408; 52/177; 52/417; 52/789.1

(58) Field of Classification Search ............ 52/408, 52/741.1, 459, 177, 417, 789.1; 428/141, 428/156
See application file for complete search history.

(56) References Cited

U.S. PATENT DOCUMENTS

| | | | |
|---|---|---|---|
| 1,257,144 A * | 2/1918 | Stanwood ............ 52/177 |
| 3,041,219 A | 6/1962 | Steck | |
| 3,654,044 A * | 4/1972 | Hirota ............ 428/151 |
| 3,969,181 A * | 7/1976 | Seabold ............ 156/577 |
| 4,053,339 A | 10/1977 | Story | |
| 4,404,252 A | 9/1983 | Hetzler | |
| 4,405,675 A | 9/1983 | Dessens | |
| 4,689,275 A * | 8/1987 | Sandman ............ 428/537.1 |
| 4,888,930 A | 12/1989 | Kelly | |
| 4,937,992 A * | 7/1990 | Dawson et al. ............ 52/316 |
| 4,992,331 A | 2/1991 | DeCoste | |
| 5,093,185 A * | 3/1992 | Ungar et al. ............ 428/204 |
| 5,187,000 A * | 2/1993 | Chow et al. ............ 428/141 |
| 5,270,119 A * | 12/1993 | Yanutola ............ 428/507 |

(Continued)

OTHER PUBLICATIONS

Huber Engineered Woods, PerformMAX™ 500 Product Sheet (Huber Reference HUB 208), first sale date Sep. 21, 2000.

(Continued)

*Primary Examiner*—Brian E Glessner
(74) *Attorney, Agent, or Firm*—Patricia L. Ades; Cheryl J. Tubach

(57) ABSTRACT

The invention comprises a wall sheathing barrier system having moisture permeability and simple improved installation method. The system comprises adjoined structural panels. Each panel has an overlay paper bonded permanently to the structural panel, which provides a moisture permeable barrier and a textured skid-resistant surface. The skid resistant surface may include indicia for aligning strips of tape or for aligning fasteners. Further, the seams of adjoining panels are sealed with a sealing means to complete the moisture barrier.

58 Claims, 8 Drawing Sheets

U.S. PATENT DOCUMENTS

| | | | |
|---|---|---|---|
| 5,335,473 A * | 8/1994 | Chase | 52/745.08 |
| 5,425,976 A | 6/1995 | Clarke | |
| 5,515,659 A * | 5/1996 | MacDonald et al. | 52/474 |
| 5,647,934 A | 7/1997 | Vaders | |
| 5,661,937 A * | 9/1997 | Doppler et al. | 52/410 |
| 5,687,517 A * | 11/1997 | Wiercinski et al. | 52/177 |
| 5,700,570 A * | 12/1997 | Fahmy | 428/342 |
| 5,718,786 A | 2/1998 | Lindquist | |
| 5,859,114 A | 1/1999 | Davis | |
| 5,955,203 A | 9/1999 | Briggs | |
| 6,120,869 A | 9/2000 | Cotsakis | |
| 6,131,353 A * | 10/2000 | Egan | 52/408 |
| 6,253,530 B1 * | 7/2001 | Price et al. | 52/793.1 |
| 6,293,069 B1 | 9/2001 | Monda | |
| 6,308,491 B1 * | 10/2001 | Porter | 52/794.1 |
| 6,355,333 B1 * | 3/2002 | Waggoner et al. | 428/174 |
| 6,434,897 B1 * | 8/2002 | Sievers et al. | 52/177 |
| 6,455,151 B1 | 9/2002 | Sakashita | |
| 6,460,304 B1 * | 10/2002 | Kim | 52/408 |
| 6,516,580 B1 * | 2/2003 | Maietta | 52/483.1 |
| 6,673,417 B1 * | 1/2004 | Gudet | 428/156 |
| 6,675,544 B1 | 1/2004 | Ou | |
| 6,715,249 B2 * | 4/2004 | Rusek et al. | 52/481.1 |
| 6,737,155 B1 | 5/2004 | Ou | |
| 6,772,569 B2 | 8/2004 | Bennett | |
| 6,800,352 B1 * | 10/2004 | Hejna et al. | 428/138 |
| 6,892,498 B1 * | 5/2005 | Roman | 52/79.5 |
| 6,925,766 B2 * | 8/2005 | Di Pede | 52/408 |
| 6,988,343 B2 * | 1/2006 | Gleeson et al. | 52/459 |
| 7,021,018 B2 * | 4/2006 | Peng | 52/549 |
| 7,155,868 B2 * | 1/2007 | Cole et al. | 52/394 |
| 7,159,368 B2 * | 1/2007 | Peng | 52/393 |
| 2001/0028943 A1 * | 10/2001 | Mashiko et al. | 428/195 |
| 2002/0018908 A1 * | 2/2002 | Smith et al. | 428/600 |
| 2003/0079431 A1 * | 5/2003 | Schuman et al. | 52/506.01 |
| 2003/0113534 A1 | 6/2003 | Poisson | |
| 2003/0126817 A1 | 7/2003 | Gleeson | |
| 2003/0129348 A1 | 7/2003 | Peng | |
| 2003/0131550 A1 | 7/2003 | Cole | |
| 2003/0199217 A1 * | 10/2003 | Cashin et al. | 442/394 |
| 2004/0029469 A1 * | 2/2004 | Anderson et al. | 442/77 |
| 2004/0103608 A1 * | 6/2004 | Lionel | 52/408 |
| 2004/0226247 A1 | 11/2004 | Byrd | |
| 2005/0016088 A1 * | 1/2005 | Pursall et al. | 52/177 |
| 2006/0048464 A1 * | 3/2006 | Suzuki et al. | 52/177 |
| 2006/0053737 A1 | 3/2006 | Jaffee | |
| 2006/0053738 A1 | 3/2006 | Jaffee | |
| 2006/0053739 A1 | 3/2006 | Jaffee | |
| 2006/0141191 A1 * | 6/2006 | Seth et al. | 428/40.1 |
| 2007/0044397 A1 * | 3/2007 | Wiercinski et al. | 52/177 |
| 2008/0141604 A1 * | 6/2008 | Arthurs et al. | 52/408 |
| 2008/0145681 A1 * | 6/2008 | Toas et al. | 428/500 |
| 2008/0190048 A1 * | 8/2008 | Kitakado | 52/177 |

OTHER PUBLICATIONS

Huber Engineered Woods tri-fold pamphlets with product overview including PerformMAX™ (Huber Reference HUB 223), first sale date Sep. 21, 2000.

CoFair Products, Inc., Tite-Seal™ Self-Adhesive Waterproof Flashing Flyer.

U.S. Appl. No. 60/547,029, filed Feb. 23, 2004, Bennett et al.

U.S. Appl. No. 60/547,031, filed Feb. 23, 2004, Bennett et al.

Non-Final Office Action mailed Mar. 17, 2009, U.S. Appl. No. 11/029,535, filed Jan. 4, 2005, Title: "Panel for Sheathing System and Method," First Named Inventor: John L. Bennett.

Final Office Action mailed Mar. 2, 2009, U.S. Appl. No. 11/029,293, filed Jan. 4, 2005, Title: "Panelized Roofing System and Method," First Named Inventor: John L. Bennett.

Non-Final Office Action mailed Jun. 19, 2009, U.S. Appl. No. 11/029,293, filed Jan. 4, 2005, Title: "Panelized Roofing System and Method," First Named Inventor: John L. Bennett.

* cited by examiner

US 7,677,002 B2

WALL SHEATHING SYSTEM AND METHOD OF INSTALLATION

This invention claims priority benefit to U.S. Patent Application Ser. No. 60/547,029 filed Feb. 23, 2004, and U.S. Patent Application Ser. No. 60/547,031 filed Feb. 23, 2004.

FIELD OF THE INVENTION

The wall sheathing system of the present invention relates generally to building construction designed to provide moisture permeable wall panels that protect from bulk water, air and heat transfer. More particularly, the invention relates to wall sheathing systems composed of structural panels having liquid and moisture barriers and a sealing means, which seals the seams between adjoining panels and the method of installing the system.

BACKGROUND OF THE INVENTION

Wall panel construction systems of residential or commercial buildings do not typically provide simple, efficient, and safe means of installation. Most often in these systems, an extra step must typically be added to the installation process to prevent liquid moisture and air from passing through the wall. Specifically, constructing a wall with a weather barrier requires not only that panels be attached to framing members, but also a house wrap is unrolled and spread over the walls. The house wrap is attached to the sheathing panels with staples or button cap nails and fenestration openings for windows or doors must be cut out of the wrap and the flaps from these openings folded back and stapled down. The house wrap is often difficult to install because it is in typical nine-ft wide rolls, which can be cumbersome to maneuver by workers on scaffolding or in windy conditions. It is desirable for wall sheathing panels to shed precipitation, such as rain and snow, during construction so that the interior remains dry. Accordingly, there is a need in the art for wall-sheathing panels, which are resistant to bulk water but permeable to water vapor and create a simplified, safe, and time-saving installation process by means of a surface overlay member or coating permanently bonded thereon. While it is important that the barrier layer shed bulk water, it should allow for the escape of water vapor. If the barrier were to trap water vapor in a wall panel, the build-up of moisture could lead to rot or mold growth that is undesirable.

The present invention provides a wall sheathing system comprising structural panels, a mass-transfer barrier, and seam sealing means.

A general object of this invention is to provide a wall system that provides a barrier to bulk water, air and heat transfer, irritants, insects and mold but can be permeable to moisture vapor movement and is suitable for use behind numerous exterior finishes, such as siding, EIFS, brick, stucco, lap siding, vinyl, and the like.

Another object of this invention is to provide an installation method for the wall sheathing system, which is easy to assemble and install.

To achieve the foregoing and other objects, this invention describes a wall sheathing system comprising structural panels. Each structural panel includes a moisture permeable barrier, which consists of a surface overlay member bonded to the structural panel. The system also includes a sealing means that seals the joints or seams of adjoining panels, wall penetrations, and other interfaces.

Furthermore, the assembly consists of a simple process. Panels are affixed with a barrier layer and fastened to a building frame in a side-by-side manner, with or without a tongue and groove connection. Next, a sealing means, such as tape, laminate, caulk, foam, spray, putty, mechanical means, or any other suitable sealing mechanism, is used to seal the joints or seams between adjoining panels, thus completing the moisture barrier.

Further novel features and other objects of the present invention will become apparent from the following detailed description, drawings, and claims.

Reference will now be made in detail to embodiments of the invention, an example of which is illustrated in the accompanying drawings.

DETAILED DESCRIPTION OF THE INVENTION

All parts, percentages and ratios used herein are expressed by weight unless otherwise specified. All documents cited herein are incorporated by reference.

In the present invention and method the finished wall system 10 may be used in conjunction with numerous exterior finishes, such as siding (vinyl, wood, metal), EIFS, brick, stucco, lap siding, vinyl, or the like. As used herein, "wood" is intended to mean a cellular structure, having cell walls composed of cellulose and hemicellulose fibers bonded together by lignin polymer. "Wafer board" is intended to mean panels manufactured from reconstituted wood wafers bonded with resins under heat and pressure.

By "wood composite material" it is meant a composite material that comprises wood and one or more other additives, such as adhesives or waxes. Non-limiting examples of wood composite materials include oriented strand board ("OSB"), waferboard, particle board, chipboard, medium-density fiberboard, plywood, and boards that are a composite of strands and ply veneers. As used herein, "flakes" and "strands" are considered equivalent to one another and are used interchangeably. A non-exclusive description of wood composite materials may be found in the Supplement Volume to the Kirk-Othmer Encyclopedia of Chemical Technology, pp. 765-810, $6^{th}$ sup. edition.

As used herein, "structural panel" is intended to mean a panel product composed primarily of wood which, in its commodity end use, is essentially dependent upon certain mechanical and/or physical properties for successful end use performance. A non-exclusive description may be found in the P5-2-92 Voluntary Product Standard.

Figure 1:
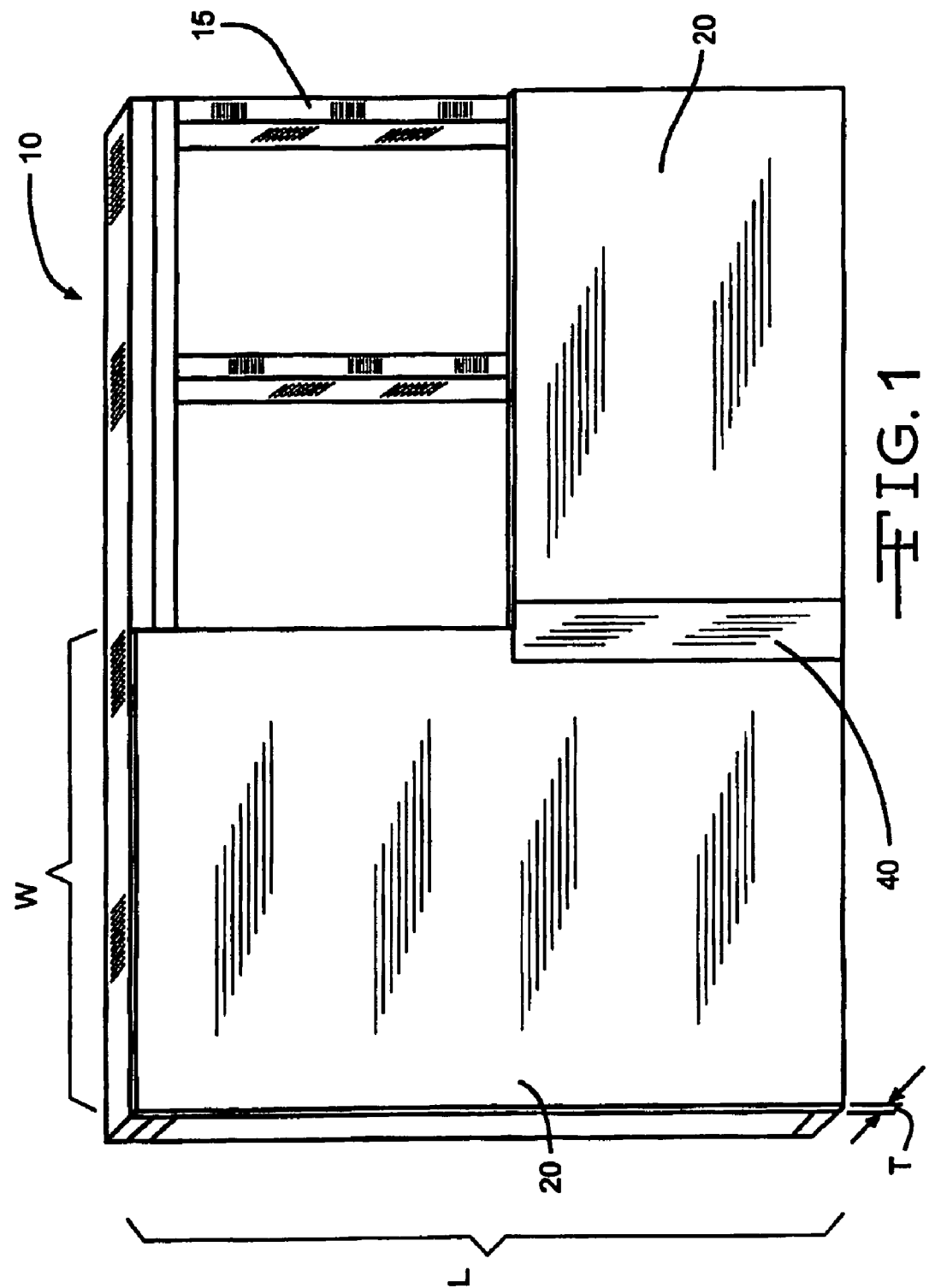
FIG. 1 is a perspective view of a three-dimensional wall sheathing system according to the present invention showing adjacent panels with lengths of tape sealing the joints therebetween, each of the lengths of tape overlapping at least one of the joints.

The following describes preferred embodiments of the present invention, which provides a panelized wall sheathing system that is suitable for use in the construction of residential and commercial buildings. FIG. 1 shows the panels 20 joined to a building frame structure 15. The panels 20, described in greater detail hereafter, have barrier layers bonded on one surface, and are generally attached to the building frame 15 in substantially abutting relationship with a plurality of fasteners (not shown) so as to form joints therebetween. One example of a paper overlaid wood board is shown and described in U.S. Pat. No. 6,737,155 entitled "Paper Overlaid Wood Board and Method of Making the Same" which is incorporated herein by reference.

Figure 2:
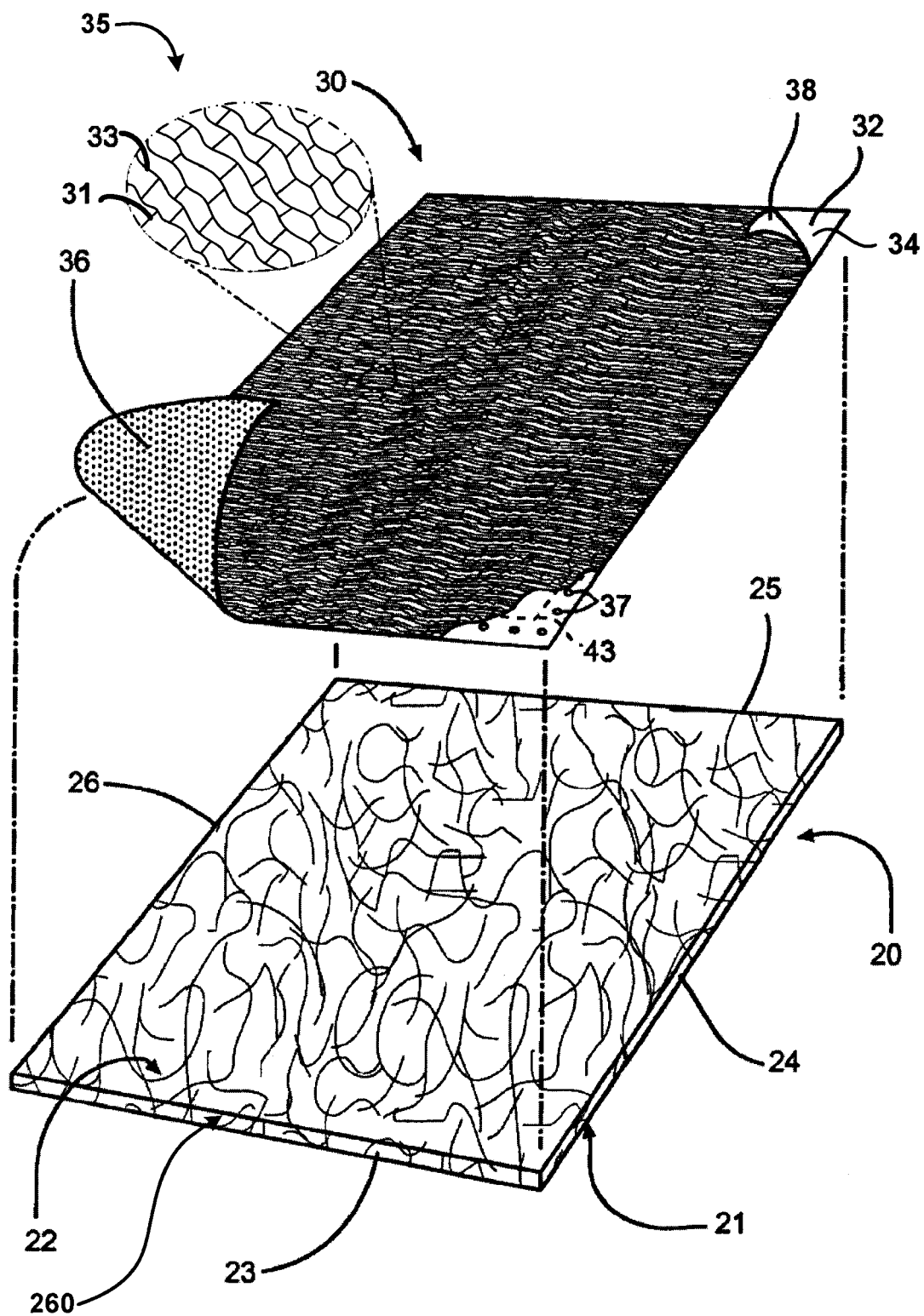
FIG. 2 is an exploded view of an embodiment of the structural panel according to the present invention and a view of the glueline for permanent bonding of the surface overlay member to the panel.

The panels 20 prepared according to the present invention may be made from a variety of different materials, such as wood or wood composite materials. As shown in FIG. 2, the panels 20 are preferably comprised of an oriented strand board substrate ("OSB") having at least two surfaces 21, 22 with at least one core layer 260 disposed between them. OSB panels are derived from a starting material that is naturally occurring hard or soft woods, singularly or mixed, whether such wood is dry (preferably having a moisture content of between 2 wt % and 12 wt %) or green (preferably having a moisture content of between 30 wt % and 200 wt %) or of a moisture content in between wet and dry (preferably having a moisture content of between about 12 wt % and 30 wt %). Typically, the raw wood starting materials, either virgin or reclaimed, are cut into veneers, strands, wafers, flakes, or particles of desired size and shape, which are well known to one of ordinary skill in the art.

Depending on the size of the panels 20 selected, the panels 20 may be installed with a horizontal or vertical orientation. In FIG. 1, panels 20 are installed vertically and horizontally and may typically be, but are not limited to a 1.219 m×2.438 m (4 ft.×8-ft.) construction. Additionally, a panel may be 1.219 m×3.048 m (4 ft.×10 ft.), 1.219 m×3.658 m (4 ft.×12 ft.), or of any desired size for the particular build.

As is well known in the field, the panels 20 may be structural, and may comprise a wood composite, such as veneers, strands, wafers, particles, fibers, and binders, or may be made from any building grade material as required for the particular build. The preferred dimensions of the wall panels 20, including the length L, width W, and thickness T of the panel may be designed to fit the particular application. Optionally, a 1.27 cm (one half inch) thick panel T is used, however a 0.635 cm (quarter inch) to 3.175 cm (1.25-inch) thick panel 20 or thicker may be used if heavier construction is desired.

Figure 3A:
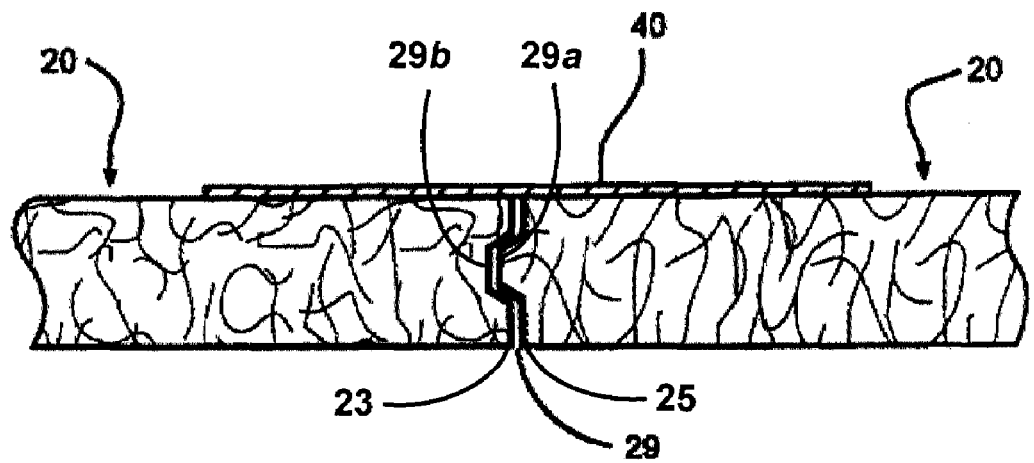
FIGS. 3A and 3B are cross-sectional views of the wall sheathing system with tongue-and-groove and edge abutting connected panels after seam sealing.
Figure 3B:
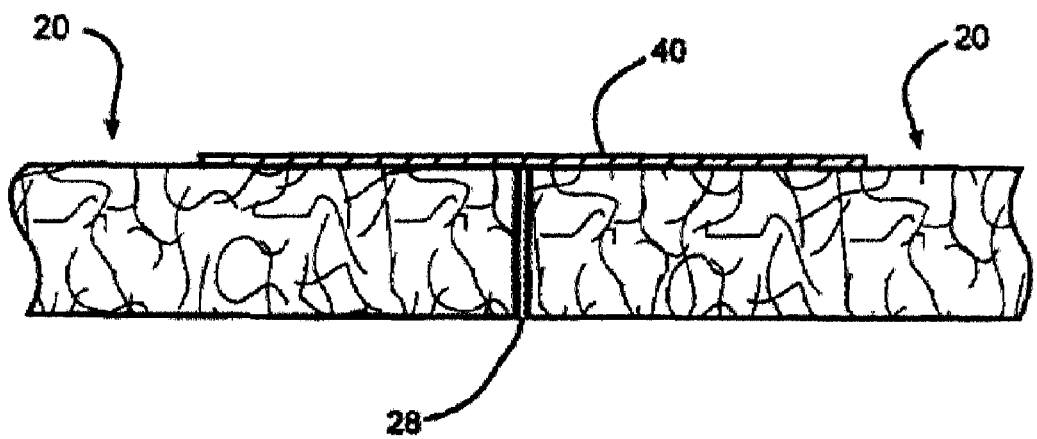
Figure 3C:
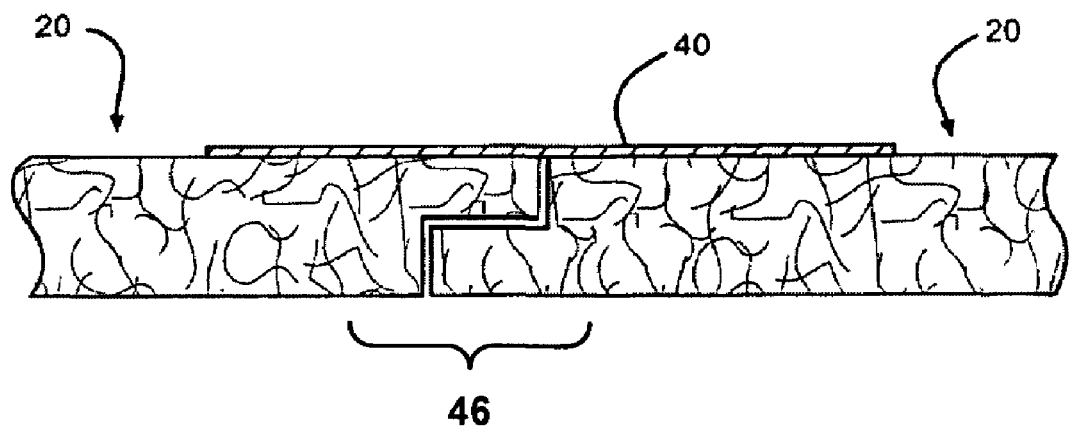
FIG. 3C is a partial cross-sectional view of two adjacent panels, in accordance with an exemplary embodiment.
Figure 3D:
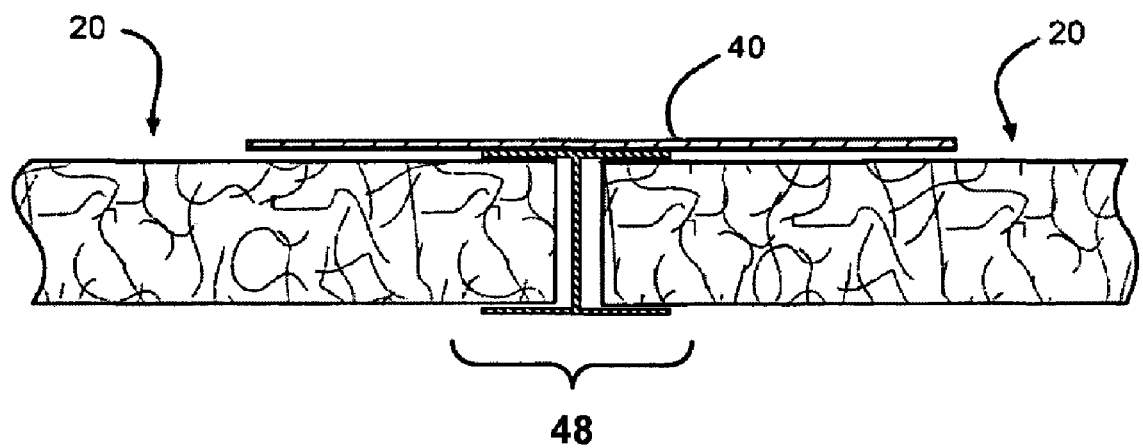
FIG. 3D is a partial cross-sectional view of two adjacent panels, in accordance with an exemplary embodiment.

As shown in FIG. 2, the structural panels 20 are quadrilateral in shape comprising an inward facing surface 21, an outward facing surface 22 and a peripheral edge, the peripheral edge defining a first 23, second 24, third 25 and fourth 26 edge of the panel 20. The first edge 23 of the panel is parallel with the corresponding third edge 25 of the panel, each of the first 23 and third 25 edges having opposing sections of equal length, and the second edge 24 of the panel is parallel with the corresponding fourth edge 26 of the panel, each of the second 24 and fourth 26 edges having opposing sections of equal length. Further, the first 23 and third 25 edges of the panel are substantially perpendicular with adjacent second 24 and fourth 26 edges. As illustrated in FIGS. 3A and 3B, one or more of the edges of the panel 20 may provide at least one tongue-and-groove 29 shape or a square edge abutting shape 28 for joining and securing panels 20 together. An example of one such tongue and groove panel is shown and described in U.S. Pat. No. 6,772,569 entitled "Tongue and Groove Panel" which is incorporated herein by reference. Referring now to FIGS. 3C and 3D, it will be understood that adjacent panels 20 may be joined together in other configurations such as, for example, a ship lap configuration 46 or an H-clip configuration 48.

Another such example is shown and described in U.S. patent application Ser. No. 10/308,649 entitled "Composite Wood Board having an Alternating Tongue and Groove Arrangement along a Pair of Edges" which is incorporated herein by reference. The length of the first edge of each panel 20 is preferably a multiple of the length of a section, with the multiple being at least two. The length of the tongue 29a in each section measured in the longitudinal direction of an edge is preferably less than or equal to the length of the grooves 29b, or the longest groove 29b in each section.

Figure 5:
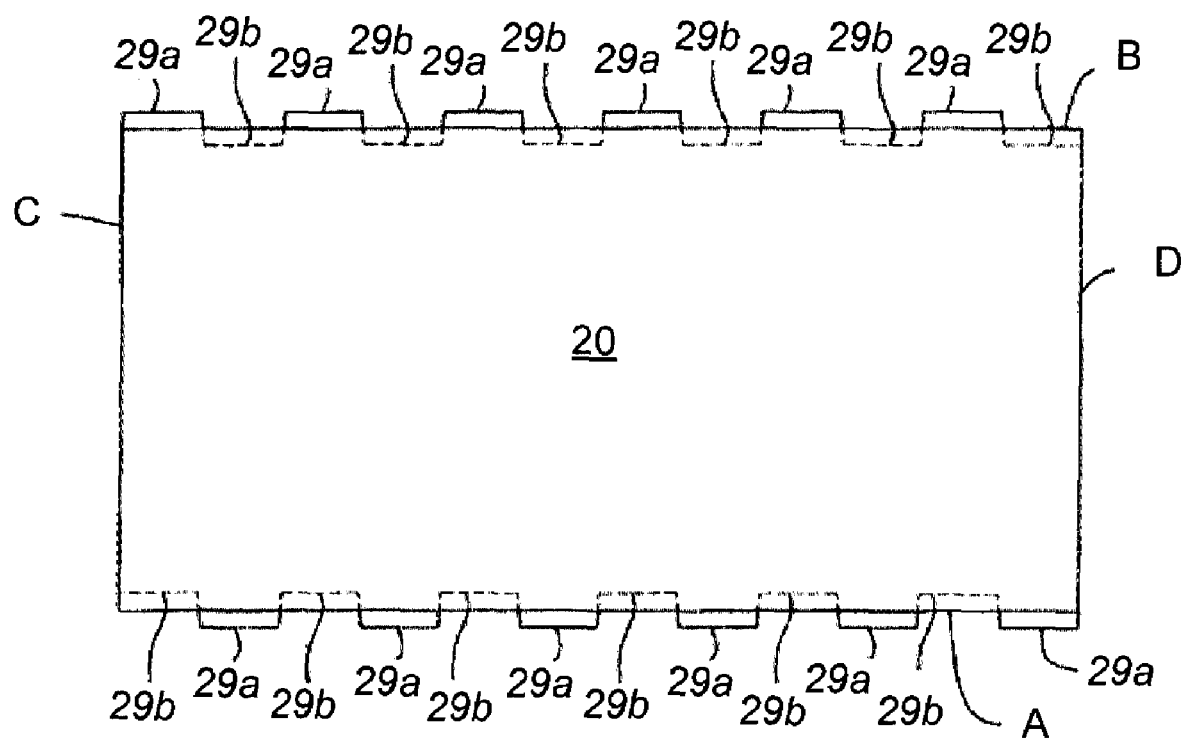
FIG. 5 is a plan view of a panel, according to the invention.

Referring to FIG. 5, panel 20 may have a first edge A, a second edge B, a third edge C and a fourth edge D. Edges A and B may be parallel. Edges C and D may be parallel and substantially perpendicular to edges A and B. Each of the edges A and B of panel 20 may include an alternating tongue and groove arrangement. Specifically, edge A includes perpendicularly extending tongues 29a and grooves 29b. Edge B is similarly constructed. It includes tongues 29a and grooves 29b. Edge C is in contact with tongue 29a of edge B and groove 29b of edge A. Edge D is in contact with groove 29b of edge B and tongue 29a of edge A. Thus, the tongues and grooves of panel 20 are directly opposite each other.

Figure 6A:
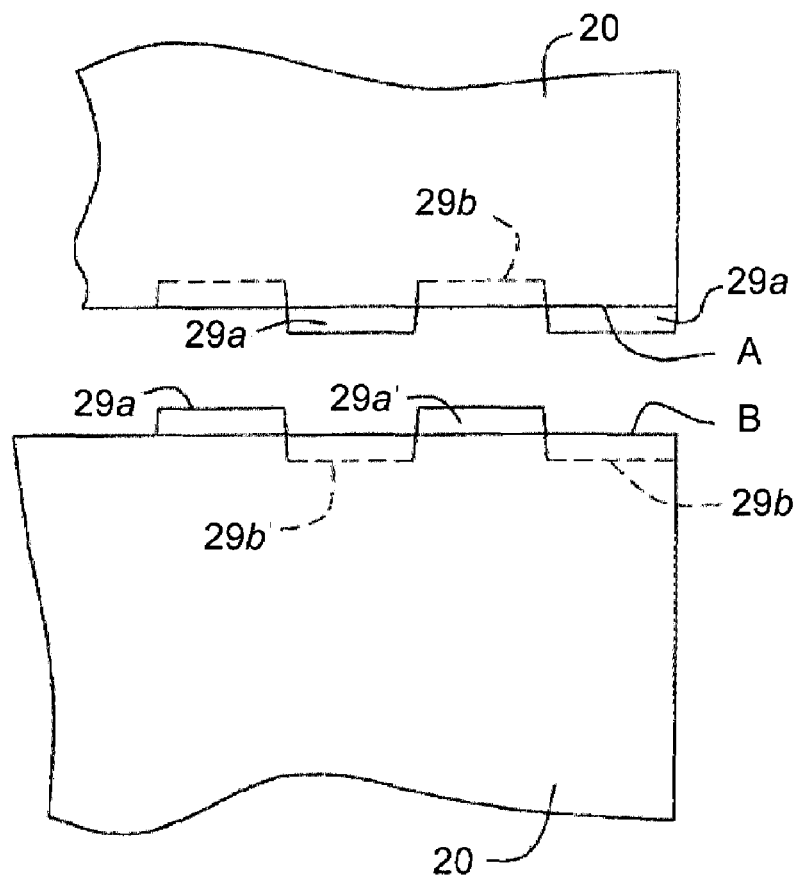
FIG. 6A is a partial plan view of a pair of panels; each according to the invention, aligned for engagement.
Figure 6B:
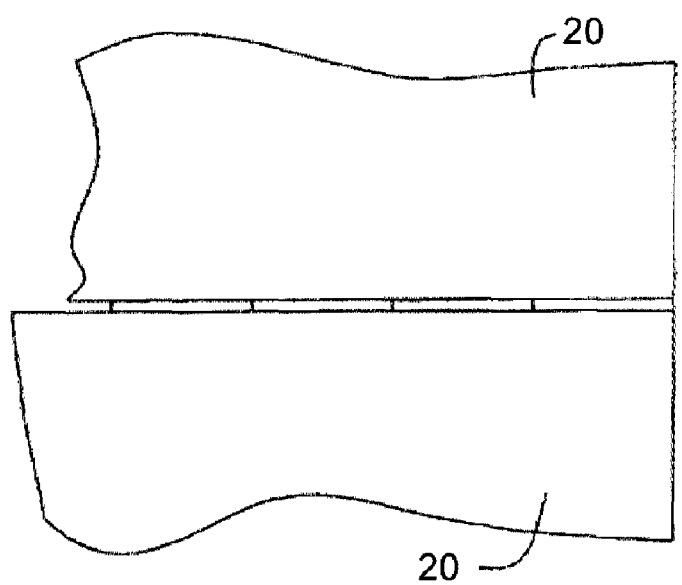
FIG. 6B is a partial plan view of a pair of panels, each according to the invention, engaged.

Referring to FIGS. 6A and 6B, the tongues 29a and grooves 29b along edge A of panel 20 can be brought into engagement with the grooves 29b and tongues 29a of edge B of adjacent panel 20. Similarly, if one of the boards 20 is rotated one hundred and eighty degrees, the tongues 29a and grooves 29b along abutting edges can be brought into engagement.

Figure 4:
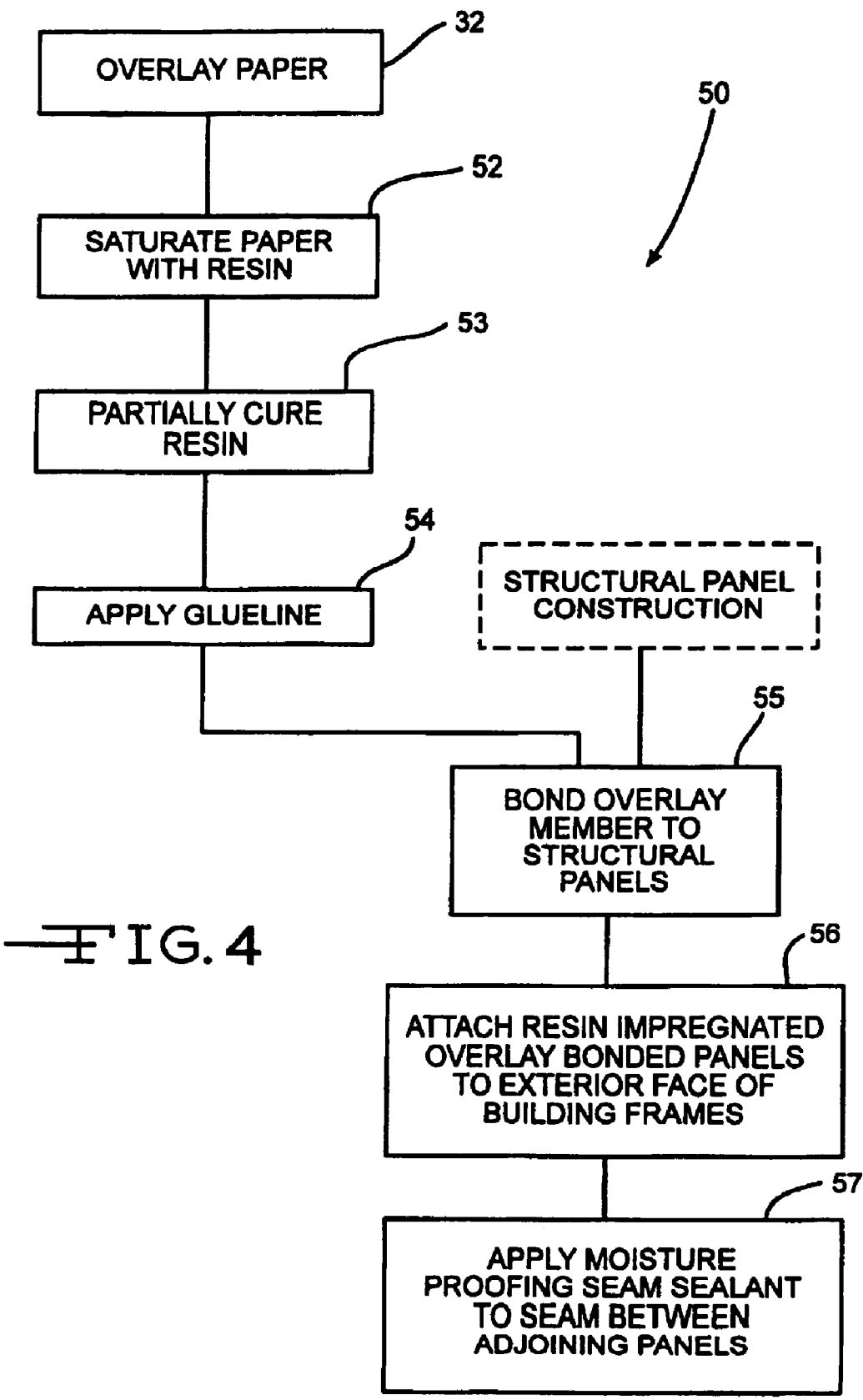
FIG. 4 is a flow diagram of the steps included in installation of a wall sheathing system method according to the present invention.
Figure 7:
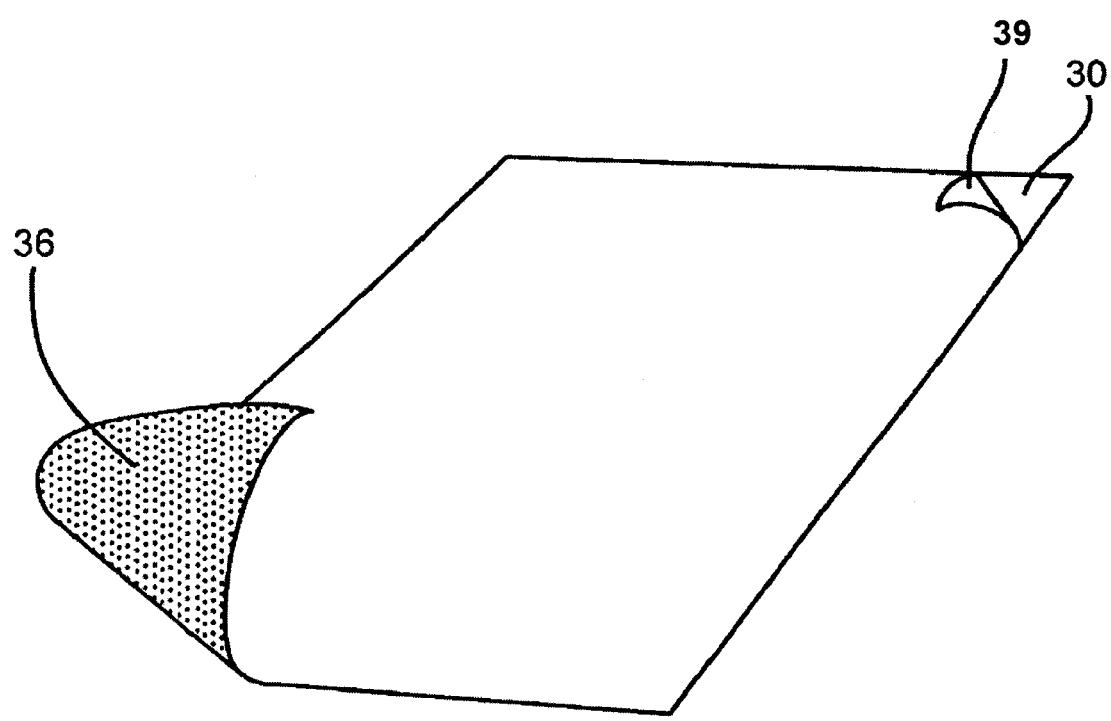
FIG. 7 is a perspective view of a barrier layer assembly, in accordance with an exemplary embodiment.

As depicted in FIGS. 2 and 4, a barrier layer 30 is comprised of a paper 32 with at least two sides. During the construction stage of the panels 20, a barrier layer 30 is bonded to each panel 20 to form the barrier. Referring to FIG. 7, optionally, the barrier layer 30 may comprise an additional layer 39, such as a UV-resistant overlay, a radiant reflective layer or the like. The barrier layer 30 is preferably comprised of three parts: paper 32, at least one of a resin-member and a glueline layer 36, each of which may affect the durability and the final permeability of the panel 20. Preferably, the paper 32 has a paper basis weight of 21.772 kg (48 lbs.) to about 102.058 k (225 lbs.) per ream or a dry weight of about 78.16 gm/m² (16 lbs./msf) to about 366.75 gm/m² (75 lbs./msf), however various weight papers 32 may be utilized for barrier layer 30. The paper 32 is preferably resin-impregnated with a resin 34 such as, but not limited to a phenol-formaldehyde resin, a modified phenol-formaldehyde resin, or other suitable resin. Preferably, the paper has a resin content of about 0% to about 80% by dry weight. More preferably, the paper has a resin content of about 20% to about 70% by dry weight. The resin 34 may be saturated on 52 and then partially cured 53 to the paper 32. This enables the paper 32 to retain the resin 34 and makes the resin-impregnated paper 32 easier to handle. The resin-impregnated paper for the panel in the panelized wall sheathing construction system of the present invention also preferably includes a glueline layer 36 in a range from about 9.77 gm/m² (2 lbs./msf) to about 244.5 gm/m² (50 lbs./msf), and more preferably of a range from about 9.77 gm/m² (2 lbs./msf) to about 58.62 gm/m² (12 lbs./msf). The glueline layer 36 may be formed from a phenol-formaldehyde resin, and isocycanate, or the like.

Further optionally, the barrier layer may comprise an applied coating layer 38. An acrylic coating such as an experimental acrylic emulsion from Akzo Nobel, or Valspar's Black Board Coating, which is asphalt based, are two examples of suitable coatings. It is understood by those skilled in the art that other classes of coatings may serve as an appropriate barrier layer. Coatings may be used with paper overlays to add the desired functions to the wall sheathing system.

The barrier layer 30 is resistant to bulk water but permeable to water vapor. The panels with barrier layers may be characterized by a permeability from about 0.1 U.S. perms to about 1.0 perms at 73° F. and 50% RH via ASTM E96 procedure A; a water vapor transmission rate from about 0.7 to about 7 grams/m²/24 hrs at 73° F. and 50% RH via ASTM E96 procedure A; a permeability from about 0.1 U.S. perms to about 12 U.S. perms at 73° F. and 100% RH via ASTM E96 procedure B, and a liquid water transmission rate from about 1 to about 28 grams/100 in²/24 hrs via Cobb ring, ASTM D5795.

An embodiment of this invention suggests that a non-skid surface that has a coefficient of friction equal to or better than plywood or oriented strand board when dry and/or wet can be achieved in a primary process that is both quick and relatively inexpensive. Specifically, the water-resistant barrier layers 30 of the present invention advantageously provide a textured surface 35 to the structural panels 20. Specifically, the textured surface 35 is adapted to provide a wet coefficient of friction in a range of from about 0.8 to about 1.1 (English XL Tribometer) and a dry coefficient of friction in a range of from about 0.8 to about 1.1 (English XL Tribometer). Examples of methodology used to measure wet surfaces may be found at pg. 173 in "Pedestrian Slip Resistance; How to Measure It and How to Improve It." (ISBN 0-9653462-3-4, Second Edition by William English)

The textured surface 35 is characterized by an embossed pattern of features or indentations. As used herein, "embossing" can mean embossing, debossing, scoring, or any other means to alter the texture of the panel other than adding grit or the like to the surface.

The texture preferably has a number of features or elements disposed in a first direction and a number of features or elements disposed in a second direction. For example, a first group of elements may be disposed in a direction across the width of a panel and a second group of elements may be disposed in a direction along the length of a panel. These elements or features disposed in first and second directions may be of similar or may be of different sizes. The elements similarly may be of different or of similar shapes. Non-limiting examples of similarly sized features include a embossed herringbone or a embossed basketweave configuration. A herringbone pattern may be very tightly disposed or may be somewhat "spread-out" in such a manner so that major channels with minor indentations are created.

The embossed textured surface preferably is more preferably comprised of a plurality of major or primary textured features and a plurality of minor or secondary textured features. Preferably, the minor or secondary textured features are at least partially disposed on one or more corresponding major feature. To illustrate, and although the general appearance of the preferred textured surface 35 appears to be a random pattern of raised areas, a closer examination of the preferred textured surface reveals finer detail. Specifically, the preferred textured surface 35 includes a plurality of major channels 33 that are disposed substantially parallel with a pair of opposing edges (preferably the shorter pair of opposing edges) of the panel. Additionally, a plurality of minor indentations 31 are disposed within the major channels 33 and run generally orthogonally to the major channels. It should be appreciated that the exploded magnified view of FIG. 2, showing the minor indentations 31 and major channels 33 in detail, is illustrative and does not necessarily represent the preferred density of minor indentations or major channels.

Although it is within the scope of the present invention to provide for advantageous slip-resistance by providing any number of major channels, preferably, the density of the major channels is about 5 to about 15 major channels per inch as measured in a direction perpendicular to the direction of the major channels. More preferably, the density of the major channels is about 9 to about 12 major channels per inch as measured in a direction perpendicular to the direction of the major channels. On a typical 4'×8' sheathing panel, the major channels will preferably run generally across the four-foot or short direction. It should be appreciated that it is not necessary nor required that the major channels be exactly parallel and may undulate slightly from side to side in a somewhat serpentine fashion rather than being straight.

Although it is within the scope of the present invention that the minor indentations 31 may vary in length and width, the minor indentations 31 have a preferably elongated shape that measures preferably about 0.0508 cm (0.020 inches) to about 0.254 cm (0.100 inches) in length and about 0.0254 cm (0.010 inches) to about 0.254 cm (0.100 inches) wide. Although it is within the scope of the present invention to provide for advantageous slip-resistance by providing any number of minor indentations, preferably, the density of the minor indentations is about 15 to about 35 of the minor indentations per inch as measured along the direction of the major channels. The long direction of the minor indentations preferably extends generally across the 2.438 m (eight-foot) (or long) direction of a typical panel.

The textured surface may also, alternatively, be created via a plurality of raised protrusions and grooves. The protrusions may have a height in a range of about 0 mils to about 25 mils, preferably from a range of about 3.0 to about 13.0 mils as measured by profilometry (Mitutoyo SJ201P).

The anti-skid surface of the present system advantageously reduces the potential for a ladder leaning thereon to slip. A worker who is applying house wrap or taping house wrap is currently exposed to the risk of his ladder skidding against the slippery surface of house wrap. Current house wrap products create the opportunity for a worker to fall from a ladder that skids against house wrap. The surface of current house wrap products promotes the likelihood of "ladder slip." Workers have complained that ladders will slide unless they apply a skid resistant product to their ladders.

An adhesive 36 is used to bond 55 the surface overlay member 30 to the outward facing surface of each of the plurality of panels 20. Optionally, the adhesive 36 is a glueline applied to 54 one side of the barrier layer 30 to facilitate attachment to the panels 20 during manufacture. Preferably, a glueline layer 36 is of a range from about 4.885 gm (1 lbs./msf) to about 244.5 gm/cm² (50 lbs./msf). More preferably, the glueline layer 36 has of a range from about 9.77 gm/cm² (2 lbs./msf) to about 177.24 gm/cm² (12 lbs./msf), creating a very efficient and durable bond. The glueline layer 36 may be composed from the group phenol-formaldehyde resin, hot-melt or PVA resin. Further optionally, the glueline layer may be isocyanate-based.

As the plurality of resin-impregnated overlay bonded panels 20 are affixed to a building frame 15 in substantially abutting relationship, joints or seams are formed there between. Referring again to FIGS. 3A and 3B, enlarged cross sectional views of the system 10 show a plurality of strips of water-resistant pressure-sensitive seam sealant 40 for sealing the joints or seams between adjacent panels 20. Seam sealant 40 may, as understood by one skilled in the art, consist of laminate, caulk, foam, spray, putty, or other mechanical means. Preferably, a plurality of strips of tape 40, installed with a hand-held tape applicator device, are used to seal seams between adjacent panels 20. Alignment guides 43 for applying the tape strips 40 are also contemplated to be placed on the panel to facilitate installation as shown in FIG. 2. Preferably, the alignment guides 43 are placed approximately a distance of about ½ the width of the tape from the panel edge. Further, fastener positioning guides 37 may also be employed as shown in FIG. 2. U.S. patent application Pub. 2003/0079431 A1 entitled "Boards Comprising an Array of Marks to Facilitate Attachment", incorporated herein by reference, provides additional detail regarding fastener indicia 37.

The permeability of the tape used at the seams can be altered for the climatic zone (cold, mixed or hot/humid) and the building design used. In some climates in building designs, the tape may not need to be permeable since adequate permeability is available through the building envelope. In other climates in building designs, the tape will have to have a high level of permeability such that the moisture escapes from the interior spaces of the wall, and mold, fungus, etc. is not supported by the trapped moisture. Where a vapor barrier is required, the tape used will have a permeability of less than 1.0 US Perm (at 73° F.-50% RH via ASTM E96 procedure B).

Permeable Barrier Tape Example

In one example, the tape 40 is polyolefin (polyethylene preferred) backing of a thickness of about 2.5 mils. to about 4.0 mils. Adhesive (butyl preferred) layered deposed on said backing is of a thickness of about 9.5 mils. to about 30 mils. Where a permeable barrier is required, the tape has water vapor transmission rate (WVTR) of greater than 1.0 U.S. perm (at 73° F.-50% RH via ASTM E96 procedure B).

Whether the tape 40 is impermeable or permeable to water vapor, it must be able to resist liquid water from entering into the building envelope. Since the seam tape will need to seal against the liquid water as traditional house wraps do, it is reasonable to require the tape to meet standards currently employed to measure liquid water penetration through house wraps, as would be readily known by one skilled in the art.

The technologies that are used to make films or fabrics with moisture vapor permeabilities greater than 1.0 U.S. perm are well known. Tapes that have high moisture vapor permeabilities are often used in medical applications. Permeable tapes are made from a variety of processes these tapes may be made bonding a pressure sensitive adhesive to a permeable layer. To improve strength, the permeable layer may be bonded to a woven or non-woven backing. Tapes may have in their structure permeable fabrics, coatings, membrane, or combinations thereof.

According to the preferred construction of the invention, the installation method 50 is shown in FIG. 4. The panels 20 are 56 attached to the exterior facing sides of the building frame 15. The attachment pattern may be edge to edge, tongue-and-groove or any other appropriate construction alignment. Conventional fastening means such as nails, ring-shank nails, screws, or any other suitable fasteners are used to attach the panel 20 to the frame 15. According to the invention, the structure is sealed by injecting, spreading or otherwise applying 57 a moisture proofing seam sealant to each seam between adjoining panels 20 so as to create a liquid water impervious seam. There is no need for the seam sealant to be flush with the exterior major panel surfaces or to bind it into the gap between the panels. Rather it is suggested that the seam sealant be applied over the exterior surfaces as shown in FIGS. 3A and 3B to assure that a sufficient seal occurs given possible panel thermal or strain cycling with changes in temperature or humidity. The seam sealant is of various lengths as required for the building.

The presently described barrier panels may also comprise a radiant barrier material which reflects energy back through the structure into the ambient environment. This reflective function limits the heat transfer between the interior and exterior of the building envelope. By controlling the heat transfer, the internal temperature is stabilized, which in turn reduces the cost of heating or cooling the house. Non-limiting examples of radiant barriers include a single-layer sheet, multiple layer foil sheets, energy-reflecting coatings, and panel bulk modifiers. An example of a single-layer radiant barrier sheet, such as metal foil, is aluminum foil. Alternatively, an example of multiple layer sheet is foil bonded to a reinforcing backing layer made from a suitable backing material, such as polymeric film, corrugated paper board, fiber board or kraft paper. Yet further alternatively, the radiant barrier may be a surface coating, coated laminate, or panel bulk-additive.

Methods of manufacturing the radiant barrier material are discussed in greater detail in U.S. Pat. No. 5,231,814, issued Aug. 3, 1993 to Hageman and U.S. Pat. No. 3,041,219, issued Jun. 26, 1962, to Steck et al. Other suitable radiant barrier material is manufactured under the name SUPER R™ by Innovative Insulation, Inc. of Arlington, Tex. These SUPER R™ products have two layers of aluminum foil each of which have an aluminum purity of 99%, and a reinforcing member located inside, between the two layers. The reinforcing member may be a reinforcing scrim or a polymer fabric.

Another panel usable with the wall sheathing system of the present invention is a panel that has improved friction under some common conditions normally found on construction sites. Specifically, the panel of the presently described embodiment was designed to achieve improved skid-resistance.

Although preferable for panels to remain dry during installation, on a construction site, the panels can be subject to moisture or wetness or have sawdust or other foreign materials deposited on their surface, which can reduce the coefficient of friction (CoF) and result in undesirable slippage. Sawdust is especially common on panel surfaces as panels often need to be cut to fit properly. Sawdust can be a significant problem as it may cause a reduction in the coefficient of friction of the sheathing panel surfaces. Accordingly, it is desired to remove as much sawdust as possible from the panel surfaces prior to walking or using a ladder thereon. Although construction workers may take some efforts to clean the sawdust off the surface of the panels using a broom, tapping the board while on the edge, or using a leaf blower, these measures often prove to be inadequate. Specifically, these sawdust removal methods do not always completely remove the sawdust from the surface. Accordingly, a panel that restores adequate skid-resistance after removing as much sawdust as possible using any suitable means or method such as those described above is desired.

Improved performance after the removal of sawdust was achieved in either of two ways. The first method of improving performance and retaining adequate friction after the removal of sawdust is to use a saturating resin in the barrier layer which has a slightly higher fraction of volatiles. The percent volatiles can be a relative reflection of the average molecular weight of the saturating resin. Accordingly, a slight change in the percent volatiles can result in a measurable change in the depth of embossing achieved in the final cure. For example, about a 6% increase in volatiles (as measured in the present experimentation from 3.5% to about 3.7% of the total weight of the resin-saturated paper, including the glueline) resulted in improved embossing in that the measured depth of at least some of the embossed features was measured to be deeper. A thorough discussion of the overlay technology, including the measurement of volatiles, is found in U.S. Pat. No. 5,955,203.

The second method of improving the frictional characteristics of the panel after the removal of sawdust was to change the type of wood furnish used to manufacture the paper in the paper overlay. It was discovered that changing the furnish used in the manufacture of the barrier layer from the typically used hardwood species to softwood species improved the retaining of friction after removal of sawdust.

To measure the friction in the presence of sawdust for the present embodiment, the coefficient of friction was measured using the English XL Tribometer. The standard techniques for using this equipment are described in ASTM F1679-04 and "Pedestrian Slip Resistance; How to Measure It and How to Improve It." (ISBN 0-9653462-3-4, Second Edition by William English). The standard methods were used to compare the various test surfaces and conditions. To test the sheathing panels with sawdust, the amount of sawdust deposited on the surface of a panel near a saw cut was measured. The sawdust deposited on a panel surface was measured by placing sheets of paper on the surface of a panel and making cuts at the edge of the paper using a circular saw with a new blade. The amount of sawdust produced by the saw was under these conditions was 2.5 g/ft$^2$. The sawdust had a size distribution as shown in Table 2 (Runs 1-4: 20 g samples; Run 5: 60 g sample; all 15 min. on vibration screen shaker.) That amount of sawdust was applied to and spread across the test specimen surface evenly as possible, then the CoF was measured using the English XL Tribometer. The sawdust was removed by tilting on its edge and tapping it with a hammer to "knock" the sawdust off and the specimen's CoF in this state was then measured. The wet condition was measured according to the procedure described at pg. 173 in "Pedestrian Slip Resistance; How to Measure It and How to Improve It." Since CoF can change depending on the surface, water was added in doses of about 1.54 g of water per test strike until the CoF remained constant. The CoF was measured for several configurations of sheathing panels and compared to existing sheathing materials as controls. The data are reported in Table 1.

The overlay panel has a texture on the surface that imparts a satisfactory CoF on the exterior surface of the panel. As described previously in the prior described embodiment, the texture results from pressing a screen into the surface of the panel and comprise major channels and minor indentations. The screen pattern is not symmetric, but has large channels that are roughly orthogonal to much smaller channels that are inside the larger channels. Ideally, the larger channels run up and down and the smaller channels run side to side when the panel is installed on a wall. It was found that a small difference in CoF was measured depending on the test direction. The average of four measurements (N, E, S, and W) is reported and the testing shown in the following tables was initiated so that the first measurement was taken with respect to the textured surface. N and S is measured along the direction of the major channels and E and W is measured generally orthogonally with the major channels. It was noted that some very small differences in CoF could be measured depending on the axis (N-S vs. E-W) along which the measurements were taken. It is also expected that the conditions under which the test is conducted will have some affect on the measured CoF. Variations in temperature and humidity may also have an affect on the measured CoF.

The texture preferably has a number of features or elements disposed in a first direction and a number of features or elements disposed in a second direction. These elements or features disposed in first and second directions may be of similar or may be of different sizes. The elements similarly may be of different or of similar shapes. Non-limiting examples of similarly sized features include an embossed herringbone or an embossed basketweave configuration. A herringbone pattern may be very tightly disposed or may be somewhat "spread-out" in such a manner so that major channels with minor indentations are created.

The embossed textured surface preferably is more preferably comprised of a plurality of major or primary textured features and a plurality of minor or secondary textured features. Although the general appearance of the preferred textured surface 35 appears to be a random pattern of raised areas, however, a closer examination of the preferred textured surface reveals finer detail. Specifically, the preferred textured surface 35 includes a plurality of major channels 33 that are disposed substantially parallel with a pair of opposing edges (preferably the shorter pair of opposing edges) of the panel. Additionally, a plurality of minor indentations 31 are disposed within the major channels 33 and run generally orthogonally to the major channels. Although it is within the scope of the present invention to provide for advantageous slip-resistance by providing any number of major channels, preferably, the density of the major channels is about 5 to about 15 major channels per inch as measured in a direction perpendicular to the direction of the major channels. More preferably, the density of the major channels is about 9 to about 12 major channels per inch as measured in a direction perpendicular to the direction of the major channels. On a typical 4'×8' sheathing panel, the major channels will preferably run generally across the four-foot or short direction. It should be appreciated that it is not necessary nor required that the major channels be exactly parallel and may undulate slightly from side to side in a somewhat serpentine fashion rather than being straightels.

Although it is within the scope of the present invention that the minor indentations 31 may vary in length and width, the minor indentations 31 have a preferably elongated shape that measures preferably about 0.508 cm (0.020 inches) to about 0.254 cm (0.100 inches) in length and about 0.0254 cm (0.010 inches) to about 0.254 cm (0.100 inches) wide. Although it is within the scope of the present invention to provide for advantageous slip-resistance by providing any number of minor indentations, preferably, the density of the minor indentations is about 15 to about 35 of the minor indentations per inch as measured along the direction of the major channels. The long direction of the minor indentations preferably extends generally across the 2.438 m (eight-foot) (or long) direction of a typical panel.

In accordance with the preferred configuration of the textured surface 35, in a typical wall sheathing application using 1.219 m (4')×2.438 m (8') panels where the 2.438 m (eight-foot) edge of the sheathing panel is parallel to the floor of the home, the major channels 33 will generally be oriented up and down, while the long direction of the minor indentations 31 will generally run parallel with the floor. Preferred depth of the major channels and minor indentations have been found to be in a range of about 5 to about 35 mils as measured by the Mitutoyo Surface Profiler. It should be appreciated that at least some of the major channels and minor indentations may be of a depth greater or deeper than the thickness of the paper (i.e., some of the major channels and minor indentations may be of a depth that would project into the surface of the panel).

For preparation of the test panels for the presently described embodiment, the overlay papers were bonded to mats in a primary process either in the lab or on the regular manufacturing line. Then, test specimens were cut from these panels. The conditions used to prepare the test panels in the laboratory were approximately: Press time: 5 minutes; Press temp: 200 C; panel dimensions: 16"×16"×0.5" thick; target density: 41.5 pcf; wood species: mixtures of pine; resin loading: face; MDI@4%; PPF@2% Core; MDI@4.5%; and wax loading: 2%.

TABLE 1

The CoF data for improved sheathing panels.

| Specimen | Condition | Average CoF | N-S CoF | E-W CoF |
|---|---|---|---|---|
| Softwood overlay paper | Dry | 0.83 | 0.79 | 0.87 |
|  | Wet | 0.77 | 0.76 | 0.78 |
|  | Sawdust | 0.48 | 0.47 | 0.47 |
|  | After Sawdust | 0.85 | 0.77 | 0.92 |
| High volatiles overlay | Dry | 0.83 | 0.79 | 0.86 |
|  | Wet | 0.82 | 0.83 | 0.81 |
|  | Sawdust | 0.42 | 0.41 | 0.43 |
|  | After Sawdust | 0.83 | 0.80 | 0.85 |
| OSB | Dry | 0.86 | 0.84 | 0.87 |
|  | Wet | 0.80 | 0.80 | 0.80 |
|  | Sawdust | 0.54 | 0.51 | 0.58 |
|  | After Sawdust | 0.72 | 0.73 | 0.71 |
| Plywood | Dry | 1.0 | >1 | >1 |
|  | Wet | 0.84 | 0.83 | 0.85 |
|  | Sawdust | 0.53 | 0.54 | 0.52 |
|  | After Sawdust | 0.62 | 0.61 | 0.63 |

Note:
The measurements in Table 1 were taken under conditions of higher temperature and humidity as compared with earlier described testing conditions.

TABLE 2

Particle size distribution of sawdust used to measure CoF.

| Sieve No. | Opening size (in microns) | Run #1 | Run #2 | Run #3 | Run #4 | Run #5 |
|---|---|---|---|---|---|---|
| 18 | 1000 | 0.19 | 0.21 | 0.19 | 0.18 | 0.47 |
| 30 | 600 | 0.6 | 0.83 | 0.68 | 0.58 | 2.17 |
| 60 | 250 | 3.44 | 4.57 | 3.42 | 3.40 | 9.90 |
| 80 | 180 | 3.53 | 3.15 | 2.98 | 2.72 | 8.76 |
| 100 | 150 | 1.30 | 2.52 | 4.28 | 1.17 | 3.10 |
| 140 | 106 | 4.71 | 5.13 | 3.23 | 2.32 | 9.78 |
| 200 | 75 | 1.12 | 1.54 | 1.79 | 2.28 | 6.48 |
| 325 | 45 | 4.07 | 1.55 | 4.11 | 3.87 | 10.79 |
| pan | 0 | 0.57 | 0.07 | 1.92 | 2.97 | 8.00 |

While the present invention has been described with respect to several embodiments, a number of design modifications and additional advantages may become evident to persons having ordinary skill in the art. While the illustrative embodiments have been described in considerable detail, it is not the intention of the applicant to restrict or in any way limit the scope of the appended claims.

What is claimed is:

1. A panelized wall sheathing construction system for a building comprising:
   building frame structure;
   a plurality of wood or wood composite panels attached to said frame structure in substantially abutting relationship so as to form joints therebetween, each one of said plurality of panels further comprising a first inward facing surface, a second outward facing surface and a peripheral edge; each one of said plurality of panels comprising a substantially bulk water resistant barrier layer adhesively secured to at least the second outward facing surface of said panel by an adhesive layer, said barrier layer comprising a substantially skid resistant embossed textured outward facing surface;
   a plurality of water-resistant sealing means, each of said means sealing at least one of said joints between adjacent panels; and
   wherein said panels with said embossed textured barrier layers are characterized by permeability in a range from about 0.1 U.S. perms to about 1.0 U.S. perms as determined by ASTM E96 procedure A (at 73° F.-50% RH), and further wherein said panels with said barrier layers are characterized by a water vapor transmission rate from about 0.7 to about 7 grams/m$^2$/24 hrs as determined by ASTM E96 procedure A (at 73° F.-50% RH), a permeability from about 0.1 U.S. perms to about 12 U.S. perms as determined by ASTM E96 procedure B (at 75° F.-100% RH), and a liquid water transmission rate from about 1 to about 28 grams/100 in$^2$/24 hrs via Cobb ring according to the test method described in ASTM D5795.

2. The panelized wall sheathing construction system of claim 1 wherein said skid resistant textured outward facing surface comprises a plurality of major textured features and a plurality of minor textured features.

3. The panelized wall sheathing construction system of claim 2 wherein said plurality of major textured features are disposed in a first direction and wherein said plurality of minor textured features are disposed in a second direction.

4. The panelized wall sheathing construction system of claim 3 wherein each of said plurality of major textured features is larger than each of said plurality of minor textured features.

5. The panelized wall sheathing construction system of claim 4 wherein said plurality of major textured features comprise a plurality of major channels and wherein said plurality of minor textured features comprises a plurality of minor indentations.

6. The panelized wall sheathing construction system of claim 3 wherein said first direction and said second direction are substantially orthogonal to one another.

7. The panelized wall sheathing construction system of claim 5 wherein said major channels are substantially parallel.

8. The panelized wall sheathing construction system of claim 5 wherein said major channels are continuous.

9. The panelized wall sheathing construction system of claim 5 wherein said major channels are discontinuous.

10. The panelized wall sheathing construction system of claim 5 wherein said major channels are characterized by an undulating configuration.

11. The panelized wall sheathing construction system of claim 5 wherein said major channels have a width of about 0.0667 to about 0.200 inches.

12. The panelized wall sheathing construction system of claim 5 wherein said major channels have a depth of about 5 to about 20 mils.

13. The panelized wall sheathing construction system of claim 5 wherein said plurality of minor indentations are disposed substantially orthogonally with said major channels.

14. The panelized wall sheathing construction system of claim 13 wherein said minor indentations have a substantially elongated configuration.

15. The panelized wall sheathing construction of claim 13 wherein said minor indentations are of a length of about 0.020 to about 0.100 inches.

16. The panelized wall sheathing construction system of claim 13 wherein said minor indentations are of a width of about 0.010 to about 0.100 inches.

17. The panelized wall sheathing construction system of claim 13 wherein said minor indentations are of a density of about 10 to about 35 indentations per inch as measured in a direction parallel with said major channels.

18. The panelized wall sheathing construction system of claim 13 wherein said minor indentations are at least partially disposed on one or more of a corresponding major channel.

19. The panelized wall sheathing construction system of claim 1 wherein one or more of said plurality of panels is comprised of reconstituted lignocellulosic furnish.

20. The panelized wall sheathing construction system of claim 19 wherein one or more of said plurality of panels further comprises a structural panel.

21. The panelized wall sheathing construction system of claim 20 wherein one or more of said plurality of panels further comprises oriented strand board.

22. The panelized wall sheathing construction system of claim 20 wherein one or more of said plurality of panels is comprised of plywood.

23. The panelized wall sheathing construction system of claim 19 wherein one or more of said plurality of panels is comprised of particleboard.

24. The panelized wall sheathing construction system of claim 19 wherein one or more of said plurality of panels is comprised of medium density fiber board.

25. The panelized wall sheathing construction system of claim 20 wherein one or more of said plurality of panels is comprised of waferboard.

26. The panelized wall sheathing construction system of claim 1 wherein said plurality of water-resistant sealing means comprises a plurality of strips of water-resistant tape said strips of tape comprising a backing and an adhesive layer and further wherein the thickness of said backing is from about ½ to about ⅟₃₀ the thickness of said adhesive layer.

27. The panelized wall sheathing construction system of claim 1 wherein said plurality of water-resistant sealing means comprises strips of water-resistant tape comprising an adhesive layer.

28. The panelized wall sheathing construction system of claim 26 wherein said plurality of strips of water-resistant tape comprises a backing of a thickness of about 0.5 mil to about 7.0 mils, more preferably about 1.0 mil to about 4.0 mils and an adhesive layer disposed on said backing of a thickness of about 1.0 mil to about 30 mils.

29. The panelized wall sheathing construction system of claim 1 wherein the thickness of each of said panels is in a range from about 0.25 inches to about 1.25 inches.

30. The panelized wall sheathing construction system of claim 1 wherein each of said barrier layers substantially covers the entire outward facing surface of a corresponding one of said panels.

31. The panelized wall sheathing construction system of claim 29 wherein said barrier layers are comprised of a paper having a dry weight of about 16 lbs./msf. to about 75 lbs./msf.

32. The panelized wall sheathing construction system of claim 31 wherein said paper is a resin-impregnated paper having a resin content up to about 80% by dry weight, preferably in the range of about 20% to about 70% by dry weight.

33. The panelized wall sheathing construction system of claim 1 wherein said barrier layer further comprises an applied coating layer.

34. The panelized wall sheathing construction system of claim 33 wherein said coating layer comprises an acrylic resin.

35. The panelized wall sheathing construction system of claim 33 wherein said coating layer comprises an asphalt base.

36. The panelized wall sheathing construction system of claim 1 wherein said system comprises a UV-resistant overlay.

37. The panelized wall sheathing construction system of claim 1 wherein one or more of said plurality of panels further comprises a radiant reflective layer.

38. The panelized wall sheathing construction system of claim 32 wherein said resin-impregnated paper comprises a glueline layer in a range up to about 50 lbs./msf.

39. The panelized wall sheathing construction system of claim 38 wherein said resin-impregnated paper comprises a glue line layer of a preferred range from about 2 lbs./msf. to about 12 lbs./msf.

40. The panelized wall sheathing construction system of claim 39 where said glueline layer is a phenol-formaldehyde resin, hot-melt, PVA resin, or other suitable means for barrier layer attachment.

41. The panelized wall sheathing construction system of claim 39 where said glue line layer is isocyanate-based.

42. The panelized wall sheathing construction system of claim 26 wherein each of said strips of tape is applied by a handheld tape applicator to at least one joint between adjacent panels to form a substantially moisture-resistant seam.

43. The panelized wall sheathing construction system of claim 42 wherein at least some of said strips of tape form a moisture-resistant seam with wall accessory materials, penetrations or interfaces.

44. The panelized wall sheathing construction system of claim 32 wherein said barrier layers are adapted to receive fasteners in a substantially moisture resistant manner.

45. The panelized wall sheathing construction system of claim 1 wherein said textured surface is adapted to provide a wet coefficient of friction that is substantially the same or better than the dry coefficient of friction.

46. The panelized wall sheathing construction system of claim 1 wherein said textured surface is adapted to provide a wet coefficient of friction in a range of from about 0.8 to about 1.1 as measured by an English XL Tribometer per ASTM F1679-04 and said textured surface adapted to provide a dry coefficient of friction in a range of at least about 0.8 as measured by the English XL Tribometer per ASTM F 1679-04.

47. The panelized wall sheathing construction system of claim 1 wherein said skid-resistant surface further comprises an anti-skid coating.

48. The panelized wall sheathing construction system of claim 1 wherein adjacent panels are linked together via at least one of a tongue and groove configuration, a ship lap configuration, an H-clip configuration, or a mating square edge configuration.

49. The panelized wall sheathing construction system of claim 46 wherein a first edge of a panel is parallel with a corresponding second edge of a panel, each of said first and second edges having contiguous sections of equal length, each section having a groove and a tongue compatible with a corresponding groove and tongue.

50. The panelized wall sheathing construction system of claim 49 wherein the length of the first edge of each panel is a multiple of the length of a section.

51. The panelized wall sheathing construction system of claim 50 wherein the length of the tongue in each section measured in the longitudinal direction of an edge is less than or equal to the length of the grooves in each section.

52. The panelized wall sheathing construction system of claim 51 wherein a third edge and a fourth edge of each of said panels are parallel.

53. The panelized wall sheathing construction system of claim 52 wherein the first and second edges of a panel are substantially perpendicular with adjacent third and fourth edges, and further wherein in each panel the grooves and tongues of the sections of the first edge are alternately disposed with a groove adjacent the third edge and a tongue adjacent the fourth edge; and the grooves and tongues of the sections of the second edge are alternately disposed with a tongue adjacent the third edge and groove adjacent the fourth edge.

54. The panelized wall sheathing construction system of claim 53, wherein the length of the tongue in each section measured in the longitudinal direction of an edge is less than or equal to the longest grooves in each section.

55. The panelized wall sheathing construction system of claim 54, wherein the length of the tongue in each section is at most the length of the length of the longest grooves in each section.

56. The panelized wall sheathing construction system of claim 1 wherein each barrier layer further comprises indicia for positioning fasteners, said fasteners being adapted to secure said panels on said building frame structure.

57. The panelized wall sheathing construction system of claim 56 wherein said indicia further comprises alignment guides for applying said strips of tape.

58. A method for drying-in a building prior to applying wall cladding comprising the steps of:

provide a building frame structure in a staged or completed condition;

providing a plurality of panels, each of said panels comprising lignocellulosic material and further comprising an inward facing surface, an outward facing surface and a peripheral edge, each of said panels further comprising a bulk water-resistant barrier layer adhesively secured to the outward facing surface of said panel by an adhesive layer, said barrier layer further comprising a textured and substantially skid resistant embossed outward facing surface; and further wherein said barrier layers are comprised of resin-impregnated paper having a dry weight of about 16 lbs./msf to about 75 lbs./msf; and further wherein said panels with said barrier layers are characterized by permeability in a range from about 0.1 U.S. perms to about 1.0 U.S. perms as determined by ASTM E96 procedure A (at 73° F.-50% RH), and further wherein said panels with said barrier layers are characterized by a water vapor transmission rate from about 0.7 to about 7 grams/m$^2$/24 hrs as determined by ASTM E96 procedure A (at 73° F.-50% RH), a permeability from about 0.1 U.S. perms to about 12 U.S. perms as determined by ASTM E96 procedure B (at 75° F.-100% RH), and a liquid water transmission rate from about 1 to about 28 grams/100 in$^2$/24 hrs via Cobb ring according to the test method described in ASTM D5795;

said panels attached to said building frame structure in substantially abutting relationship; and sealing the joints between adjacent panels with lengths of tape, each of said lengths of tape overlapping at least one of said joints between adjacent panels.

\* \* \* \* \*

UNITED STATES PATENT AND TRADEMARK OFFICE
CERTIFICATE OF CORRECTION

PATENT NO. : 7,677,002 B2
APPLICATION NO. : 11/029300
DATED : March 16, 2010
INVENTOR(S) : Bennett et al.

It is certified that error appears in the above-identified patent and that said Letters Patent is hereby corrected as shown below:

In the Specifications:

In column 5, line 16, delete "permeability" and insert -- water vapor permeance -- therefor.

In column 5, line 20, delete "permeability" and insert -- water vapor permeance -- therefor.

In column 5, line 21, delete "100% RH" and insert -- 50% RH -- therefor.

In column 7, lines 32-33, delete "permeability" and insert -- water vapor permeance -- therefor.

In column 7, lines 42-43, delete "water vapor transmission rate (WVTR)" and insert -- water vapor permeance -- therefor.

In column 7, line 53, delete "moisture vapor permeabilities" and insert -- water vapor permeance -- therefor.

In the Claims:

In column 12, line 16, in Claim 1, delete "permeability" and insert -- water vapor permeance -- therefor.

In column 12, lines 22-23, in Claim 1, delete "permeability" and insert -- water vapor permeance -- therefor.

In column 12, line 25, in Claim 1, delete "100% RH" and insert -- 50% RH -- therefor.

In column 16, line 17, in Claim 58, delete "permeability" and insert -- water vapor permeance -- therefor.

Signed and Sealed this
Sixteenth Day of April, 2013

Teresa Stanek Rea
*Acting Director of the United States Patent and Trademark Office*

CERTIFICATE OF CORRECTION (continued)
U.S. Pat. No. 7,677,002 B2

In column 16, line 23, in Claim 58, delete "permeability" and insert -- water vapor permeance -- therefor.

In column 16, line 25, in Claim 58, delete "100% RH" and insert -- 50% RH -- therefor.